US 6,581,405 B2

(12) United States Patent
Kim et al.

(10) Patent No.: US 6,581,405 B2
(45) Date of Patent: Jun. 24, 2003

(54) AIRCONDITIONING SYSTEM UTILIZING ABSORPTION CHILLER CELL

(76) Inventors: Jong Hae Kim, 818 N. Pacific Ave. #E, Glendale, CA (US) 91203; Jitae Kim, 818 N. Pacific Ave. #E, Glendale, CA (US) 91203

( * ) Notice: Subject to any disclaimer, the term of this patent is extended or adjusted under 35 U.S.C. 154(b) by 46 days.

(21) Appl. No.: 10/033,639

(22) Filed: Jan. 2, 2002

(65) Prior Publication Data

US 2002/0056288 A1 May 16, 2002

Related U.S. Application Data

(63) Continuation-in-part of application No. 09/504,149, filed on Feb. 15, 2000.

(51) Int. Cl.[7] .............................................. F25B 15/00
(52) U.S. Cl. ............................... 62/476; 62/434; 62/436
(58) Field of Search ..................... 62/476, 434, 436

(56) References Cited

U.S. PATENT DOCUMENTS 4,459,814 A * 7/1984 Schaetzle ..................... 62/175
6,023,934 A * 2/2000 Gold ........................... 62/51.1
6,192,694 B1 * 2/2001 Hiro et al. ..................... 62/141
6,192,704 B1 * 2/2001 Hiro et al. ..................... 62/484

* cited by examiner

Primary Examiner—William C. Doerrler
Assistant Examiner—Mark S. Shulman
(74) Attorney, Agent, or Firm—Erik M. Arnhem

(57) ABSTRACT

This invention relates to an airconditioning system which uses a plurality of absorption chiller-cells, for refrigerating an antifreeze fluid that is circulated through fan-coil units of an airconditioning system. The anti-freeze fluid passes through refrigerant evaporators in each cell structure in a consecutive order for lowering the temperature of the anti-freeze fluid gradually. More particularly, it relates to an absorption chiller-cell system having a plurality of evaporators employing multi-refrigerant circulation circuits in an absorption cycle to produce sufficient refrigerant for the airconditioning system. The invention enables the physical size of the system to be relatively small, so that the system can replace conventional electric airconditioning units for home applications. In further aspects, this invention provides an airconditioning system which includes a plurality of absorption chiller-cells that produce various kinds of capacity of the system by combining more or less numbers of chiller-cells, the invention provides also an easier and simpler solution for maintenance or replacement of chiller-cells.

20 Claims, 5 Drawing Sheets

AIRCONDITIONING SYSTEM UTILIZING ABSORPTION CHILLER CELL

This is a continuation-In-Part of our copending patent application, Ser. No. 09/504,149 filed on Feb. 15, 2000.

BACKGROUND AND SUMMARY OF THE INVENTION

The present invention relates to an airconditioning system utilizing a plurality of absorption chiller-cells for refrigerating a second coolant medium such as an anti-freeze solution to obtain a sufficient low temperature for the indoor fan-coil units of an airconditioning system, by circulating and exchanging heat of the second coolant medium gradually from the first absorption chiller-cell and through up to numbers of absorption chiller-cells in a consecutive order, for providing an accumulative chilling effect, to give more efficient and faster cooling.

Further the invention provides a method and apparatus for operating an absorption chiller-cell, utilizing an absorption refrigeration means which has a plurality of evaporator means. The apparatus employs multi-refrigerant circulation circuits in an absorption cycles so as to enable the physical size of the system to be smaller and the cooling capacity larger, when compared to existing absorption systems. This invention also provides an airconditioning system wherein absorption chiller-cells produce various different capacities by combining various numbers of chiller cells, chiller cells maintenance or replacement is easily accomplished.

Various systems have been devised before to make an airconditioning system utilizing an absorption refrigeration means. One known arrangement is to use water as the refrigerant and lithium bromide as the absorbent. However, this system is not suitable for home use due to its physical size and a complex construction required to solve the crystallization problem. There is also the risk of freezing due to the use of water as the refrigerant.

Another known airconditioning system uses a solution pair of ammonia as refrigerant and water absorbent. This system is relatively small compared to the system using LiBr (lithium bromide) and water, but still too big to replace the present electric airconditioning unit for home or apartment application. The main problem of the prior art absorption refrigeration cycle, is the technical difficulty in producing enough refrigerant at low temperature somewhat below that of the heat load with a small physical system. The prior art, including numerous patents and studies, is mainly concerned with the technology of improving the coefficient of performance (COP) of an absorption refrigeration system regardless of the physical size of the system. Conventional absorption refrigeration systems are not easily maintained or operated, and are therefore not adaptable for home applications.

SUMMARY OF THE INVENTION

An object of this invention is to provide an airconditioning system utilizing an absorption refrigeration means having a plurality of absorption chiller-cell structures for chilling a sufficient quantity of an antifreeze solution to a sufficient low temperature for the fan-coil units of an airconditioning system. Another object is to provide a method and apparatus for operating an absorption refrigeration system having a plurality of evaporators that provide an improved cooling capacity with a limited physical size refrigeration system. Still another object is to provide an absorption refrigeration system having a reduced physical size whereby the system can replace the cooling unit of the conventional electric airconditioning system for home use. Still another object is to provide an air conditioning system which is capable of increasing or decreasing its cooling capacity by increasing or decreasing the number of chiller-cell units to produce various different airconditioning system capacities. Still another object is to provide an absorption airconditioning system which will be easier to maintain and repair.

The outstanding characteristic of the invention is that the refrigerating means comprises a plurality of absorption chiller-cell structures for refrigerating an antifreeze fluid to sufficient low temperature; the anti freeze fluid is circulated through each absorption chiller-cell in consecutive order, to produce enough refrigerant volume to meet the cooling capacity requirements of the air conditioning system.

Another outstanding characteristic of the invention is to provide an airconditioning system based on the diffusion absorption (DA) cycle by employing multi-refrigerant circulation circuits in an absorption cycle. The DA technology is based on the Platen-Muntecs cycle and is currently manufactured internationally for hotel room and recreational vehicle refrigerators. The unique features of the new technology are (1) it can be gas-fired with no electric input required and (2) machines based on a DA cycle are essentially silent. Until the present invention it was thought that the DA cycle should consist of one refrigerant loop circuit, one solution loop circuit and one gas loop circuit; the single loop arrangement is not suitable for airconditioning systems due to its poor cooling capacity. The present invention employs multiple loop technology, i.e. multiple evaporators and multiple condensers.

Another unique characteristic of the invention is the method of heat exchange between an antifreeze and each absorption chiller-cell, employing tube-in-tube principles to create a plural evaporator and associated heat exchanging chambers. The antifreeze solution exchanges heat with the evaporating refrigerant by flowing as a liquid film along the outside surface of each evaporator tube. The temperature and volume of the antifreeze solution is controlled by using multiple evaporators in parallel flow relation, and passing the antifreeze solution in serial fashion through separate heat exchangers associated with the respective evaporators, whereby the antifreeze solution is cooled in stages.

DETAILED DESCRIPTION OF THE PREFERRED EMBODIMENTS

Figure 1:
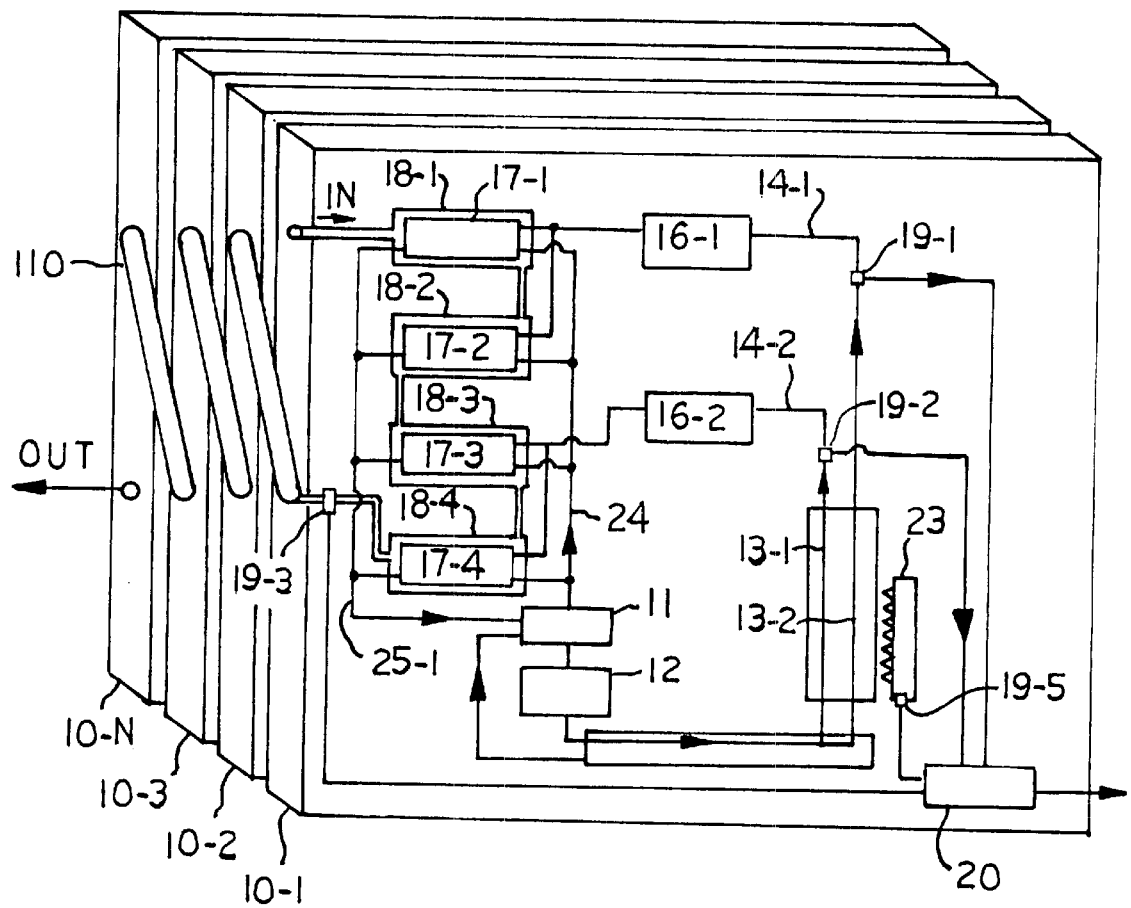
FIG. 1 is a diagram of an absorption chiller-cell refrigeration system of the present invention.

In the preferred embodiment of the invention, the ammonia is the refrigerant and water is the absorbent. FIG. 1 shows a systematic diagram of the absorption refrigeration system in conformity with the invention. The absorption refrigeration system comprises a plurality of absorption chiller-cells 10-1, 10-2, 10-3, 10-N. Each chiller-cell comprises Absorber means 11, absorber vessel 12, heating means 23, plural generator means 13-1, 13-2, with rectifier 14-1, 14-2, plural condenser means 16-1, 16-2, plural evaporators 17-1, 17-2, 17-3, 17-4, with heat exchange chambers 18-1, 18-2, 18-3, 18-4, for exchanging heat between the evaporator and antifreeze fluid flowing through the heat exchange chambers. A central processing unit 20 with thermo sensors 19-1, 19-2, 19-3, 19-4, and heating control means 19-5 is employed to control the system.

Figure 4:
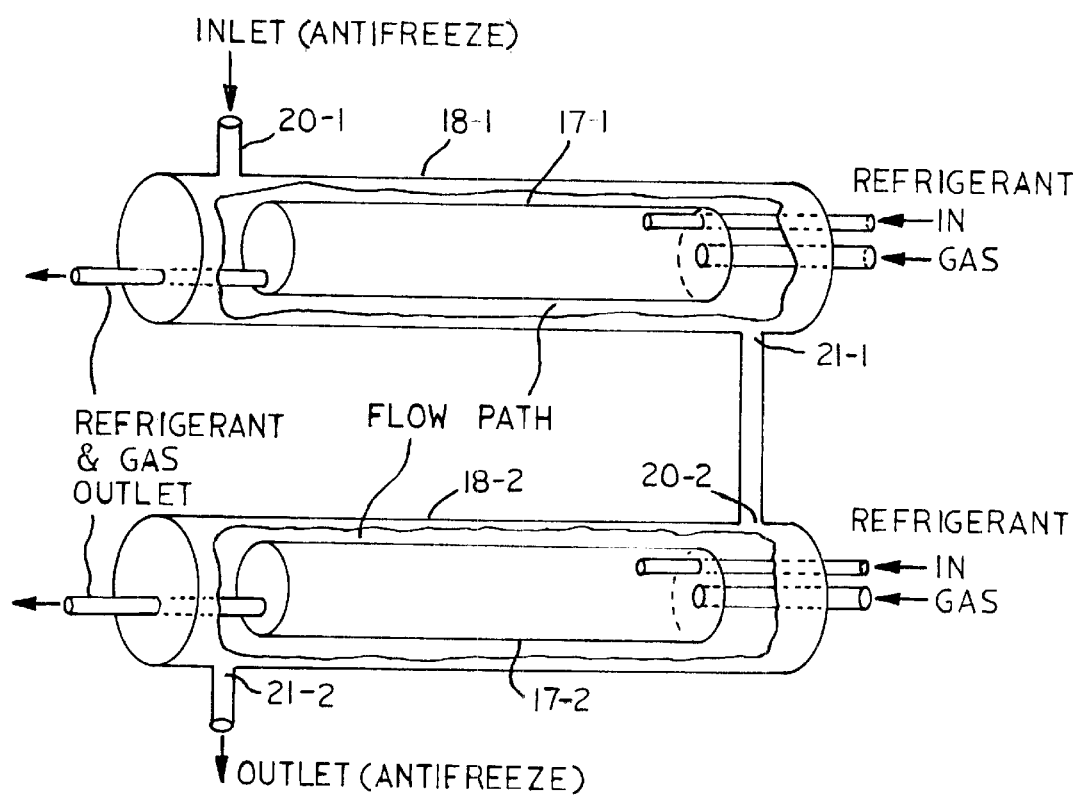
FIG. 4 is a detailed schematic diagram of two evaporators arranged in parallel flow relation, according to the invention. Each evaporator has an associated heat exchanging chamber.
Figure 5:
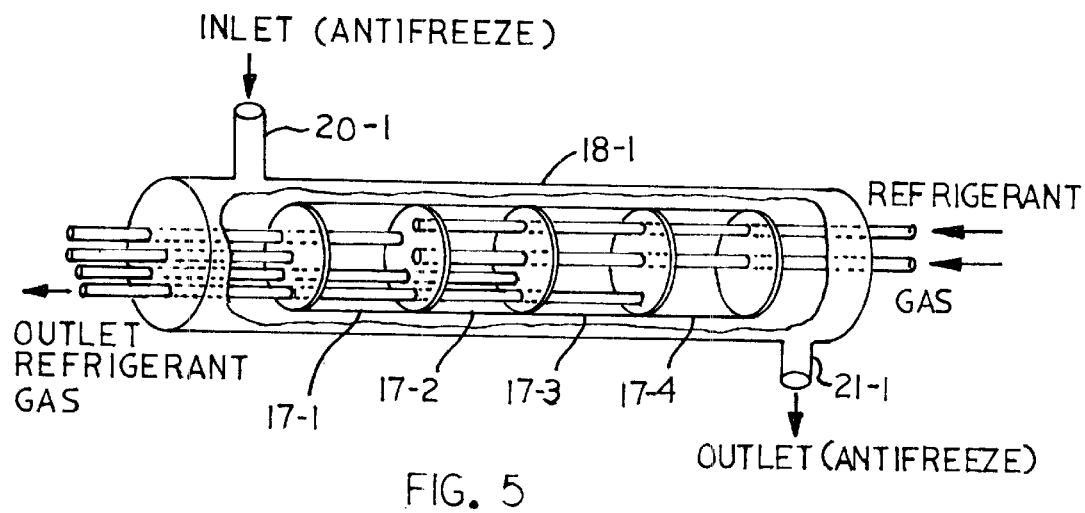
FIG. 5 is a detailed diagram of an embodiment of a heat exchange chamber of the invention in a consecutive order.

Referring to FIG. 4 each heat exchange chamber comprises an evaporator tube 17-1, 17-2, in a tube 13-1, 18-2 of a heat exchanger chamber which has a fluid inlet 20-1, 20-2, a fluid outlet 21-1, 21-2, and an antifreeze fluid flow path therebetween. In the preferred embodiment of the invention, this system uses a three component working fluid, consisting of the refrigerant (ammonia), the absorbent (water) and an auxiliary gas (hydrogen). The refrigerant serves as a transporting medium to carry energy from a-low temperature source to a high temperature sink. The water absorbs the refrigerant at low temperature and low partial pressure, and releases it at high temperature against high partial pressure. The auxiliary gas provides pressure equalization for working fluid between the condenser and evaporator.

The number of possible working fluid combinations is infinite, but in practice, the combination in wide commercial use is ammonia-water-hydrogen. Helium can also be used as the auxiliary gas, with a performance penalty. A thermodynamic representation of the invention is illustrated in FIG. 1. The representative chiller-cell uses a single refrigeration cycle with multi-refrigerant circulation loop circuits that include generator means 13-1, 13-2, and plural evaporators 17-1, 17-2, 17-3, 17-4 in the loop circuit. This arrangement results in a significantly increased cooling effect by cooling the anti freeze coolant in stages. This circuit produces the desired working temperature in each evaporator in a different manner than the prior absorption refrigeration concepts, resulting in a different relationship between the components in each refrigeration circuit.

The conventional diffusion absorption (DA) cycle has three fluid loop circuits, consisting of an ammonia loop circuit, a gas loop circuit and ammonia-water solution loop circuit. The ammonia loop circuit includes all the components, since ammonia circulates through all the components. Ammonia-Water solution circuit flows through the solution loop circuit, which includes the generator (bubble pump), absorber and solution heat exchanger, The auxiliary gas circulates through the gas loop circuit, which includes the evaporator, absorber and auxiliary gas heat exchanger. The conventional DA cycle has only one ammonia loop circuit employing only one evaporating means, so that the performance is limited and not enough to feed the cooling capacity of an airconditioning system.

The present invention configures multi-ammonia loop circuits at a DA cycle for feeding multi-evaporator means to produce enough ammonia vapor for operating a plurality of heat exchange chambers, i.e. by transferring heat to the evaporator tubes from an antifreeze solution that flows through the serially connected heat exchange chambers 18-1, 18-2, 18-3, 18-4 by a circulation pump. As shown in FIG. 1, a preferred absorption solution mixture (ammonia and water) and the auxiliary gas (hydrogen gas) are collected in the absorber vessel 12. These are at sufficient pressure to condense ammonia at room temperature. When heat from the heating means 23 is supplied to the generator means 13-1, 13-2, bubbles of ammonia gas are produced and rise. The vapor contains a small quantity of water vapor which can be removed by passing the mixed vapor through the rectifier tubes 14-1, 14-2, by heat rejection. The small amount of water in the ammonia runs back and drains to the absorber vessel 12 through rectifiers, leaving the dry ammonia vapor to pass to the condensers 16-1, 16-2. While the ammonia vapor passes into the finned condensers 16-1, 16-2, air circulating over the fins of the condensers removes heat from ammonia vapor, which condenses into liquid ammonia. The ammonia flows through the evaporators 17-1, 17-2, 17-3, 17-4., to cool an anti-freeze solution flowing serially through heat exchangers 18-1, 18-2, 18-3 and 18-4.

The evaporators are supplied with hydrogen, by tube 24. The hydrogen passes across the surface of the ammonia and returns back into absorber vessel 12, to lower the ammonia vapor pressure enough to allow the liquid ammonia to evaporate. The evaporation of the ammonia extracts heat from the evaporator tubes. This, in turn, extracts heat from the antifreeze fluid in the heat exchange chambers 18-1, 18-2, 13-3, 18-4, lowering the temperature of the antifreeze fluid. The ammonia-rich gas mixture leaves the bottom of the evaporators 17-1, 17-2, 17-3, 17-4, and passes down through the tube 25-1 to the absorber 11. In the absorber 11, the ammonia is absorbed from the gas by the liquid solution. The auxiliary gas, which is almost insoluble in the liquid is free to rise up from the top of the absorber 11 and pass into the evaporators 17-1, 17-2, 17-3, 17-4, together with some residential ammonia vapor. The hydrogen and ammonia gas circulation loop is driven by natural convection, caused primarily by the large density differences associated with the ammonia fraction in the vapor.

The liquid circulation in the cycle is driven by the heat-powered bubble pump shown schematically in FIG. 1. This cycle operates continuously as long as the tubes of the generator 13-1, 13-2, means is heated. The thermostats 19-1, 19-2, 19-3, 19-4, which control the heat source 19-5 through controller 20, regulate the temperature of the antifreeze fluid. The antifreeze fluid is circulated from the first heat exchange chamber 18-1 of the first evaporator 17-1, through the second heat exchange chamber 18-2 of the second evaporator 17-2, through the third heat exchange chamber 18-3 in the third evaporator 17-3, and finally through the fourth heat exchange chamber 13-4 of the fourth evaporator 17-4 by a pump, so that the fluid temperature is lowered gradually.

Ammonia-poor hydrogen enters into each of the evaporators, and the auxiliary gas atmosphere accommodates the partial pressure of the ammonia vapor in accordance with Dalton's law. As the ammonia evaporates into the hydrogen, the partial pressure of the ammonia gas rises, and the evaporation temperature also rises. Thus, the plural evaporators 17-1, 17-2, 17-3, 17-4 (employing a multi-refrigerant circulation circuit in an absorption cycle) significantly increases the cooling capacity for the airconditioning application, when compared to the prior art, which employs a single evaporator means in an absorption cycle.

According to the invention, the cooling capacity of each chiller-cell depends on the number of evaporators and the refrigerant loop circuit in an absorption cycle. Depending on cooling capacity needed for an appropriate temperature level, the system can adjust the number of chiller cells. If the air space to be cooled is small, for example, four chiller cells are available. Meanwhile, if the space to be cooled is large, more chiller cells can be used, to adjust the cooling capacity.

Figure 2:
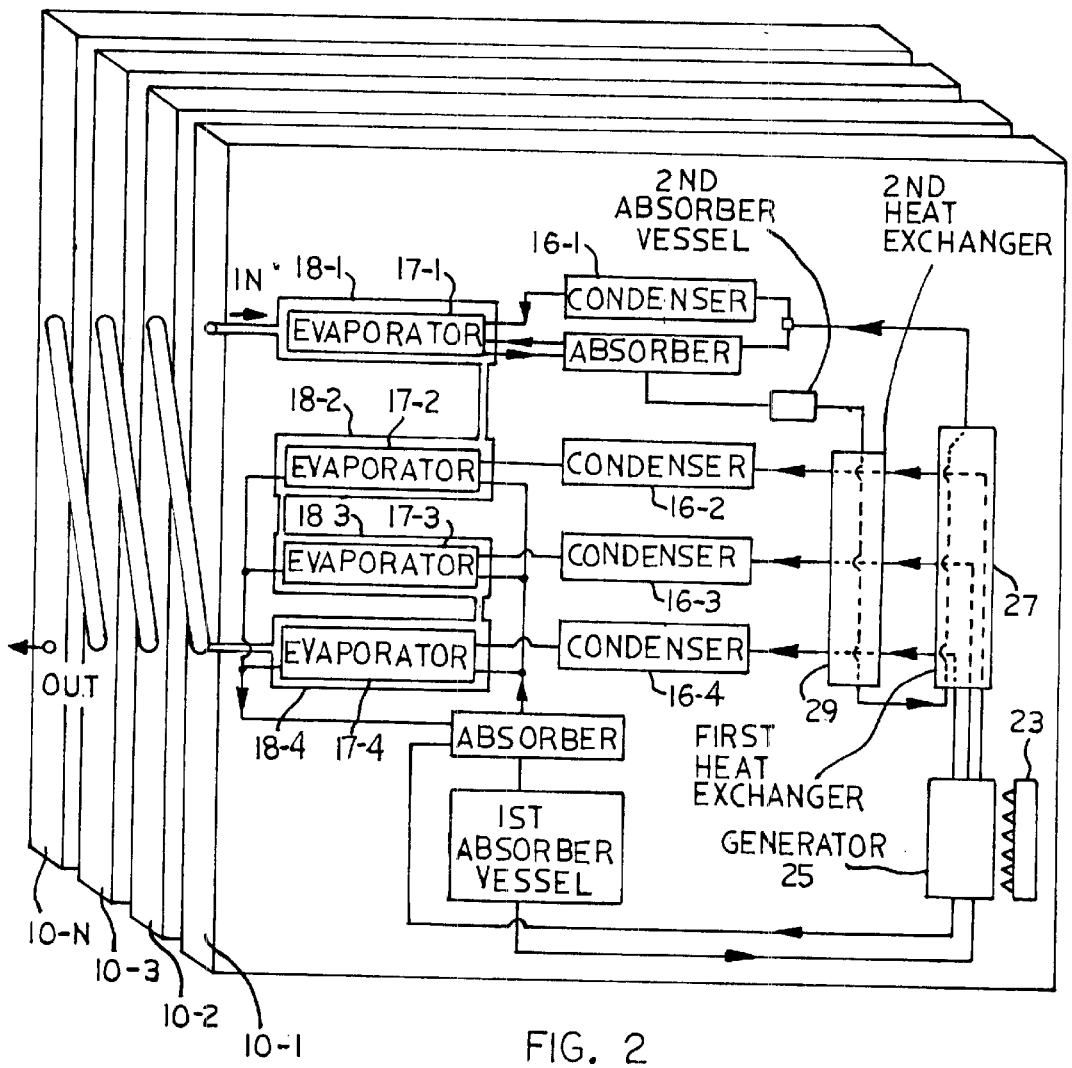
FIG. 2 is a diagram of a double effect absorption chiller system of the present invention.

As shown schematically in FIG. 2, another useful embodiment of the invention comprises a first diffusion absorption refrigeration system (or circuit) that includes a multiple refrigerant generator 25. The generator feeds heated refrigerant vapor through three tube systems in heat exchangers 27 and 29. Each tube system supplies refrigerant to at least one evaporator and at least one condenser. Heat exchangers 27 and 29 act as refrigerant generators for a second absorption refrigeration system (or circuit). Refrigerant in the second circuit is heated by the tubes of the first heat exchanger 27 of the first diffusion absorption system after the refrigerant solution has been pre-heated by the tubes in the second heat exchanger 29.

The second refrigeration circuit includes a condenser 16-1 and evaporator 17-1.

The FIG. 2 system includes four evaporators 17-1, 17-2, 17-3, 17-4 that are individually supplied with liquid refrigerant from four condensers 16-1, 16-2, 16-3 and 16-4. The evaporators are arranged in parallel flow relation for achieving a gradual staged cooling of the liquid coolant (antifreeze solution) flowing serially through the associated heat exchangers 18-1, 18-2, 18-3, 18-4.

Figure 3:
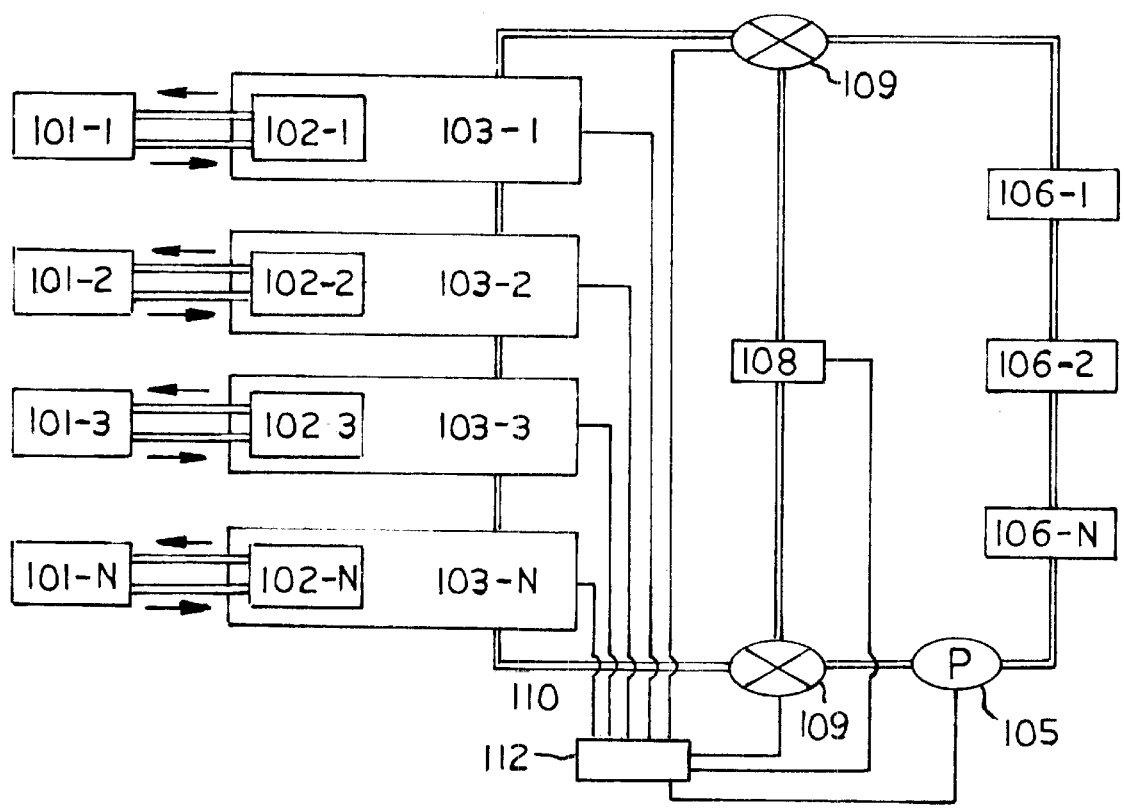
FIG. 3 is a diagram of an air conditioning system embodying the present invention.

FIG. 3 illustrates schematically one embodiment of the invention which can be used either for cooling or heating. If it needs to be installed for both heating and cooling the room, an interceptive valve 109 and antifreeze heating means 108 can be linked to the IN/out pipe of the chiller-cell. When heating the room, an antifreeze supply pipe of each chiller-cell is turned off by interceptive valve 109, while it turns on to operate a pump 105 to circulate the antifreeze, which is heated by heating means 108. The heated fluid is pumped through fan-coil units 106-1, 106-2, and 106-3.

The antifreeze is employed as a second refrigerant of the system to protect its chiller-cell and heat exchange chambers against freezing in winter. The temperature and circulation speed of the antifreeze are controlled by a central processing unit 112. When after-service is required, the servicing procedure is relatively-simple and doesn't require stopping all functions of the system because only the problemed chiller-cell needs to be replaced.

The invention, in overcoming all of the aforesaid drawbacks of the prior art, presents a new technology, with a small sized improved absorption refrigeration means having multi-evaporators to produce various kinds of capacity of absorption airconditioning systems by combining more or less numbers of small sized chiller-cell type cooling means, rather than a single type large sized Cooling means with a fixed cooling capacity. Further, the system provides a more efficient heat-transfer by circulating antifreeze to extract heat by the evaporation of the refrigerant, thereby lowering gradually the temperature and making a faster and more efficient staged cooling effect. Further, the cooling capacity can be adjusted by adding or subtracting chiller-cells. The foregoing description has been set forth merely to illustrate the invention and is not intended to be limiting. It is herein understood that although the present invention has been specifically disclosed with the preferred embodiments and examples, modifications and variations of the concepts of the described embodiments may be resorted to by those persons skilled in the art. Such modifications and variations are considered to be within the scope of the invention and the appended claims.

What is claimed:

1. An air conditioning system comprising a plurality of absorption refrigeration means, a fan-coil air cooling means, means for transferring heat from said air cooling means to said refrigeration means, and means for controlling the system;

each said refrigeration means comprising at least one refrigerant evaporator, a refrigerant absorber means, a refrigerant generator means, and a refrigerant condenser means connected together in a closed circuit;

said heat transfer means comprising an antifreeze coolant circuit that includes said fan-coil air cooling means, a coolant pump, and a heat exchanger associated with each said refrigerant evaporator; each said heat exchanger having an antifreeze coolant inlet, an antifreeze coolant outlet, and an antifreeze coolant flow path therebetween for exchanging heat between the respective evaporator and the flowing coolant;

said heat exchangers being in series flow relation with each other so that the antifreeze coolant is cooled in stages as it travels from the fan-coil air cooling means through the heat exchangers and back to the fan-coil air cooling means;

said means for controlling the system comprising a central processing unit for controlling the temperature and speed of antifreeze coolant circulation.

2. The system according to claim 1, wherein said absorption refrigeration means comprises a plurality of generator means, a plurality of condenser means, a plurality of evaporator means, connected to an absorber means for making a plurality of refrigerant circulation circuits therein.

3. The system according to claim 1, wherein said absorption refrigeration means comprises a diffusion absorption refrigeration means having a plurality of evaporators in multi-refrigerant circulation circuits in an absorption cycle that uses a three component working fluid consisting of a volatile refrigerant, an absorbent and an auxiliary gas.

4. The system according to claim 1, wherein said absorption means comprises:

a first refrigerant circuit, and a second refrigerant circuit;

said first refrigerant circuit including a generator (25), first heat exchange means (27) receiving volatile refrigerant from said generator and a second heat exchange means (29) receiving refrigerant from said first heat exchange means;

said second refrigerant circuit including an absorber, and means for passing refrigerant from said absorber sequentially through said second heat exchange means and said first heat exchange means, whereby said first and second heat exchange means function collectively as a refrigerant generator.

5. The system according to claim 4, wherein said first heat exchange means comprises multiple sets of tubes for separately receiving refrigerant from said generator, and said second heat exchange means comprises multiple sets of tubes for separately receiving refrigerant from the separate tubes in said first heat exchange means.

6. The system according to claim 5, wherein the multiple sets of tubes in said first and second heat exchange means are arranged in parallel flow relation.

7. The system of claim 4, wherein said first refrigerant circuit includes a condenser receiving refrigerant from said first heat exchange means, and said second refrigerant circuit includes at least one condenser receiving refrigerant from said second heat exchange means.

8. The system according to claim 1, further comprising a heating means coupled to means for controlling the system for heating said antifreeze coolant.

9. The system according to claim 1, wherein said refrigeration means includes multiple refrigerant evaporators connected in parallel flow relationship between said condenser means and said absorber means.

10. The system according to claim 1, wherein each said refrigeration means comprises a plurality of evaporators enclosed in an associated heat exchanger.

11. A refrigeration method utilizing a plurality of refrigeration chiller cells comprising;
   (a) providing a plurality of absorption refrigeration means comprising a generator means, a condenser means, an evaporator means and an absorber means operatively connected together;
   (b) configuring a heat exchange chamber on said each evaporator means by encasing the evaporator tubes in a heat exchanger which has a coolant fluid inlet, coolant fluid outlet and a coolant fluid flow path there-between, and flowing the coolant fluid in the form of a fluid film along the outside surfaces of the evaporator tubes;
   (c) Circulating the coolant fluid from a first heat exchange chamber through up to N numbers of heat exchange chambers repeatedly to decrease the temperature of the said coolant fluid gradually by a circulation pump, and
   (d) Controlling the circulation speed and temperature of the second refrigerant fluid and the function of the said absorption refrigeration means by a central processing unit.

12. The method according to claim 11, wherein the absorption refrigeration means further comprises a diffusion absorption refrigeration means utilizing a three-component working fluid consisting of a refrigerant, an absorbent and an auxiliary gas.

13. The method according to claim 11, wherein the absorption refrigeration means further comprises a plurality of generator means, a plurality of condenser means, a plurality of evaporator means connected to an absorber means to form a plurality of refrigerant circuits.

14. The method according to claim 11, wherein absorption the refrigeration means further comprises a first diffusion absorption refrigerant circuit having a multi-tube generator with at least one evaporator means, and a second diffusion absorption refrigerant circuit having at least one generator operated by the heat of the generator of the first diffusion absorption refrigerant circuit.

15. The method according to claim 12, wherein the working fluid comprises a solution pair of ammonia and water, and gas.

16. The method according to claim 11, wherein said heat exchange chamber further comprises evaporator's tube means divided into a plurality of compartments, each compartment having a fluid inlet and a fluid outlet of refrigerant fluid and a gas inlet and a gas outlet of the auxiliary gas each and being located in the tube of the said heat exchange chamber in a consecutive order.

17. The method according to claim 16, wherein said heat exchange chambers are oriented so that the heat exchangers are in series flow relation, and the evaporators are in parallel flow relation.

18. A diffusion absorption refrigeration apparatus using a three component working fluid consisting of a refrigerant means, an absorbent means and an auxiliary gas means comprising:
   (a) a plurality of generator means, each generator means having a plurality of bubble pump means to make multi-refrigerant circulation circuits in a diffusion absorption cycle;
   (b) a plurality of condenser means for said plurality of generation means;
   (c) a plurality of evaporator means for said plurality of generator means; and
   (d) an absorber means operatively connected between said evaporator means and said generator means.

19. The refrigeration apparatus according to claim 18, wherein:
   (a) said evaporator means comprises an evaporator tube located in a tube type heat exchange means, said heat exchange means having a fluid inlet, a fluid outlet and a coolant fluid flow path there between, whereby an antifreeze coolant fluid film flows along the outside surface of the evaporator's tube.

20. An absorption refrigeration apparatus, comprising:
   (a) a plurality of generator means, condenser means and evaporator means;
   (b) an absorber means operatively connected between said means and said generator means;
   (c) a heat exchange chamber associated with each evaporator means, each heat exchange chamber having a fluid inlet, a fluid outlet and a coolant fluid flow path there between for flowing a coolant fluid in the form of a fluid film along an outside surface of an evaporator tube; and,
   (d) a pump for circulating the coolant fluid from the first said heat exchange chamber and through up to N numbers of the heat exchange chamber in a consecutive order in loop for chilling the coolant fluid accumulatively.

* * * * *